United States Patent
Donderici

(10) Patent No.: US 10,353,090 B2
(45) Date of Patent: Jul. 16, 2019

(54) TIME-BASED PROCESSING OF BROADBAND BOREHOLE ACOUSTIC DATA

(75) Inventor: Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1353 days.

(21) Appl. No.: 14/005,747

(22) PCT Filed: Apr. 1, 2011

(86) PCT No.: PCT/US2011/030935
§ 371 (c)(1),
(2), (4) Date: Sep. 17, 2013

(87) PCT Pub. No.: WO2012/134496
PCT Pub. Date: Oct. 4, 2012

(65) Prior Publication Data
US 2014/0019058 A1  Jan. 16, 2014

(51) Int. Cl.
| | |
|---|---|
| G01V 1/28 | (2006.01) |
| G01V 1/30 | (2006.01) |
| G01V 1/36 | (2006.01) |
| G06F 17/40 | (2006.01) |
| G06F 19/00 | (2018.01) |
| G01V 1/48 | (2006.01) |

(52) U.S. Cl.
CPC .............. *G01V 1/30* (2013.01); *G01V 1/28* (2013.01); *G01V 1/36* (2013.01); *G01V 1/48* (2013.01); *G06F 17/40* (2013.01); *G06F 19/00* (2013.01)

(58) Field of Classification Search
CPC ... G01V 1/48; G01V 1/30; G01V 1/36; G01V 1/28; G06F 17/40; G06F 19/00
USPC ............................................ 702/17
See application file for complete search history.

(56) References Cited

U.S. PATENT DOCUMENTS

| | | | | |
|---|---|---|---|---|
| 2,972,733 A | * | 2/1961 | Bucy, Jr. ............. | G01V 1/288 342/378 |
| 2,982,371 A | * | 5/1961 | Prickett, Jr. ......... | G06G 7/1914 367/45 |
| 3,070,749 A | * | 12/1962 | Burns ................... | G01V 1/364 327/284 |
| 3,512,127 A | * | 5/1970 | Burg ..................... | G01V 1/366 367/24 |
| 3,652,980 A | * | 3/1972 | Goupillaud ............ | G01V 1/28 367/46 |
| 6,654,688 B1 | | 11/2003 | Brie et al. | |

(Continued)

FOREIGN PATENT DOCUMENTS

WO   2008/150253 A1   12/2008

OTHER PUBLICATIONS

International Search Report and Written Opinion, International Application No. PCT/US2011/030935, 9 pgs., dated Nov. 26, 2012.

(Continued)

*Primary Examiner* — Stephanie E Bloss
(74) *Attorney, Agent, or Firm* — Benjamin Fite; Baker Botts L.L.P.

(57) ABSTRACT

Methods and systems for improving time-semblance processing of acoustic data are disclosed. Acoustic data is obtained from a tool in a formation. A delay filter is then designed and applied to the obtained acoustic data to obtain delayed acoustic data. Time semblance is then applied to this delayed acoustic data.

17 Claims, 20 Drawing Sheets

(56) References Cited

U.S. PATENT DOCUMENTS

| | | | | | |
|---|---|---|---|---|---|
| 6,837,332 | B1* | 1/2005 | Rodney | ............ | G01V 1/48 |
| | | | | | 181/0.5 |
| 6,856,912 | B2* | 2/2005 | Fehmers | ............ | G01V 1/364 |
| | | | | | 702/14 |
| 7,508,734 | B2* | 3/2009 | Fink | ............ | G01V 11/002 |
| | | | | | 367/43 |
| 7,649,805 | B2* | 1/2010 | Bose | ............ | G01V 1/48 |
| | | | | | 367/38 |
| 2004/0172197 | A1* | 9/2004 | Fehmers | ............ | G01V 1/364 |
| | | | | | 702/6 |
| 2005/0254343 | A1* | 11/2005 | Saiki | ............ | G01V 1/36 |
| | | | | | 367/31 |
| 2009/0067286 | A1* | 3/2009 | Bose | ............ | G01V 1/48 |
| | | | | | 367/38 |
| 2012/0069713 | A1* | 3/2012 | Geerits | ............ | G01V 1/48 |
| | | | | | 367/99 |
| 2014/0019058 | A1* | 1/2014 | Donderici | ............ | G01V 1/48 |
| | | | | | 702/17 |
| 2018/0045845 | A1* | 2/2018 | Dumont | ............ | G01V 1/50 |

OTHER PUBLICATIONS

International Preliminary Report on Patentability, International Application No. PCT/US2012/030935, dated Oct. 10, 2013, 6 pages.

* cited by examiner

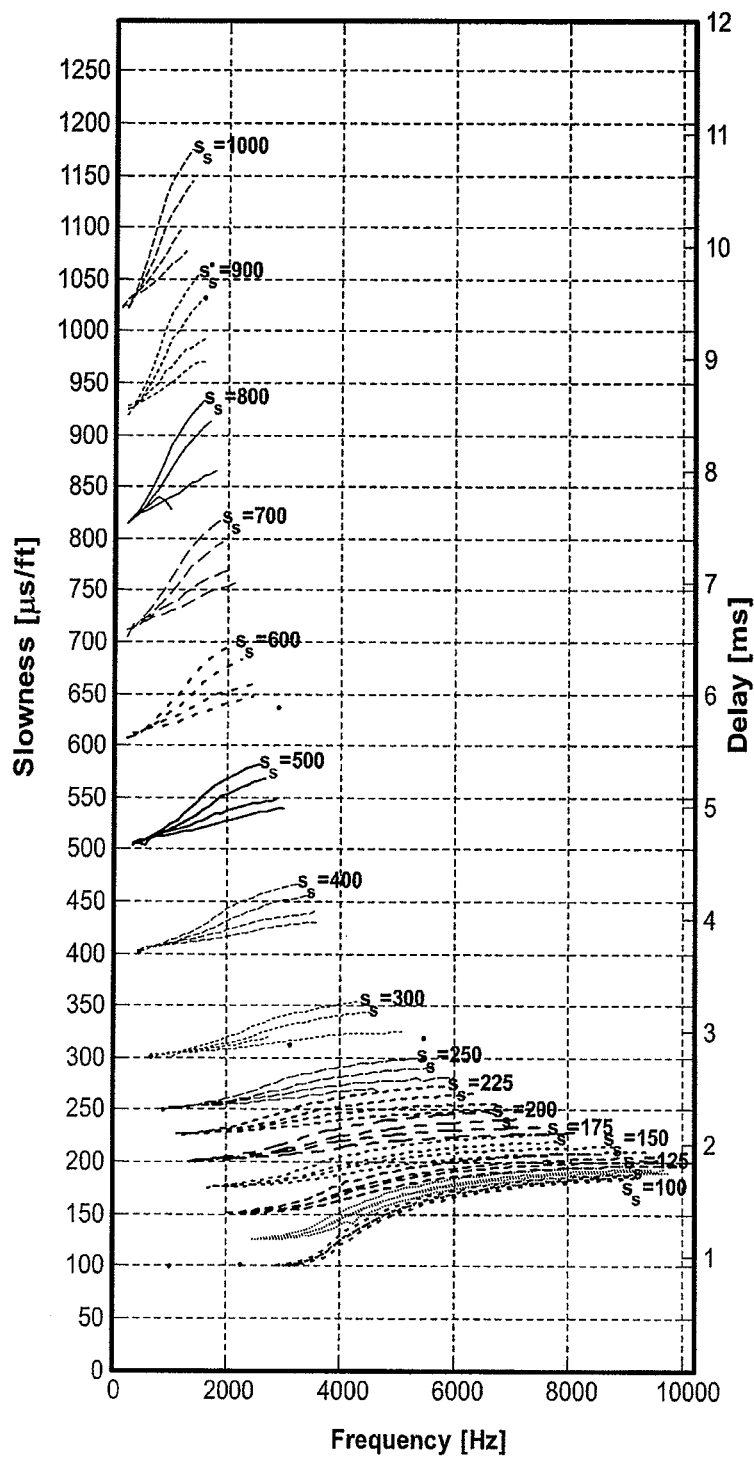

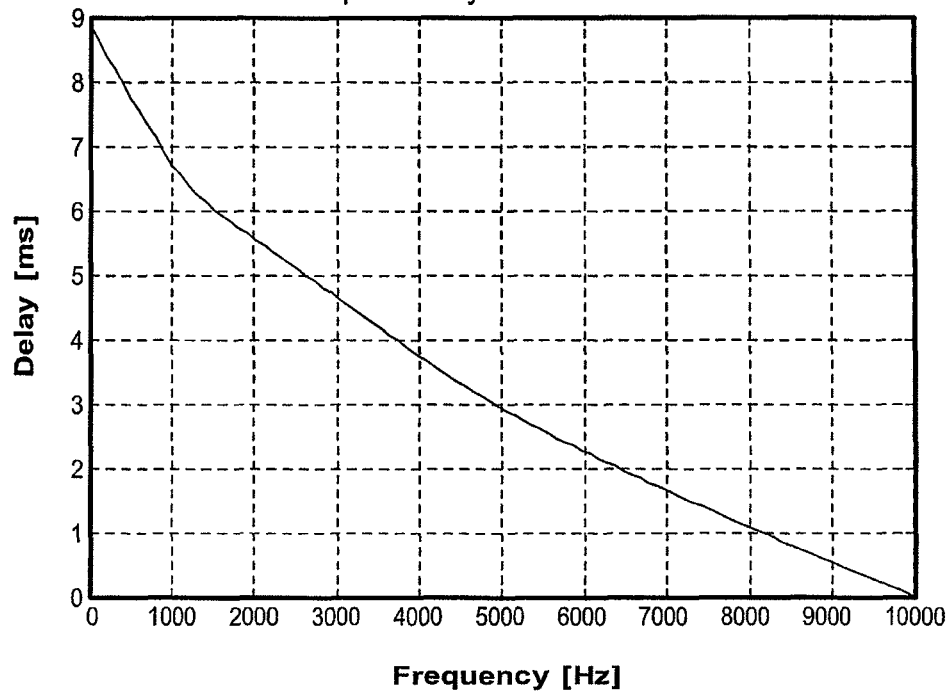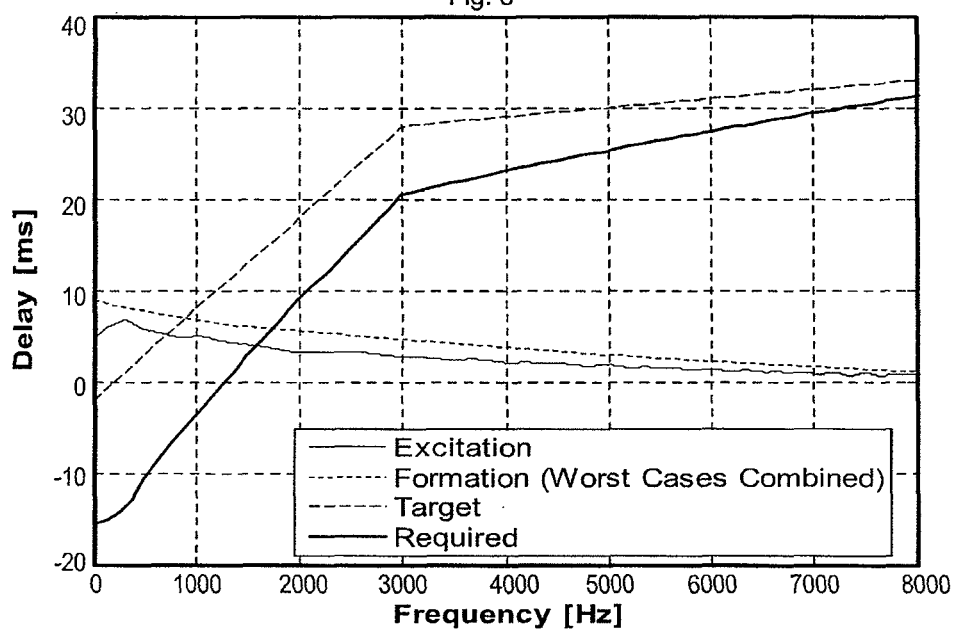

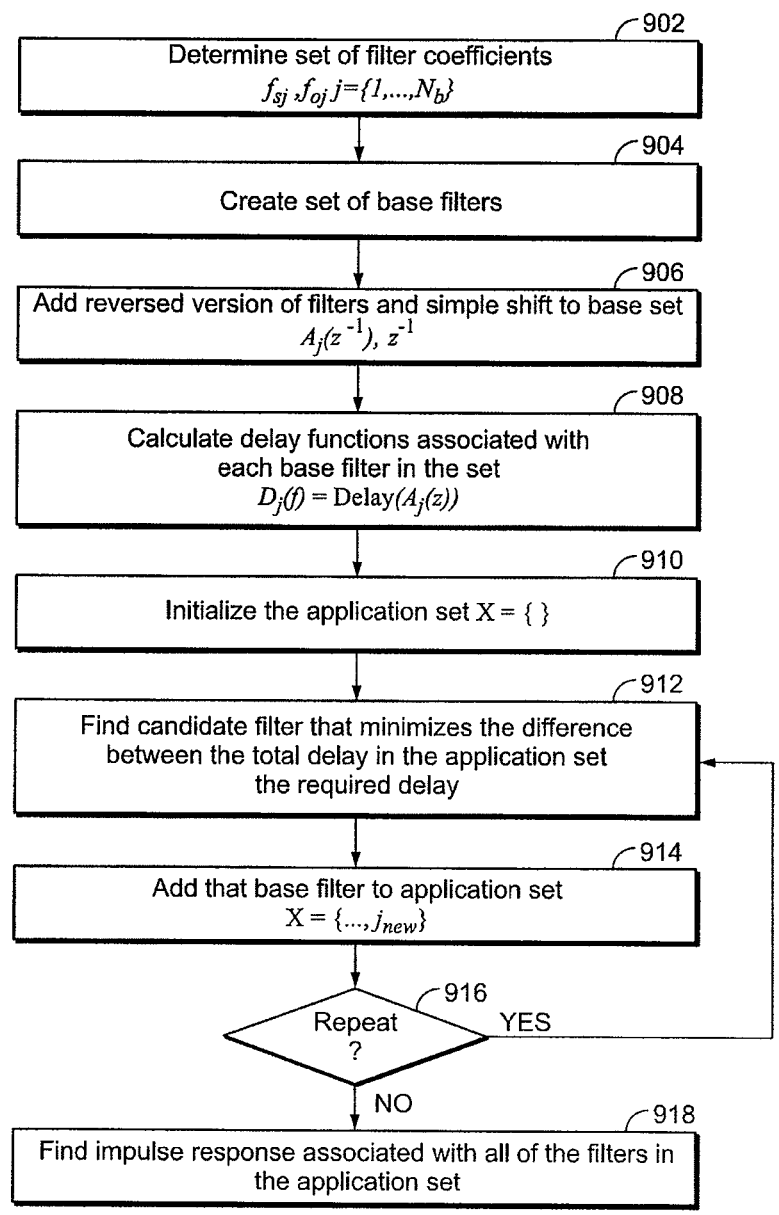

After-Filter

Total Number of 2-Pole Filters = 329

TIME-BASED PROCESSING OF BROADBAND BOREHOLE ACOUSTIC DATA

CROSS-REFERENCE TO RELATED APPLICATIONS

This application is a U.S. National Stage Application of International Application No. PCT/US2011/030935 filed Apr 1, 2011, and which is hereby incorporated by reference in its entirety.

BACKGROUND

As oil well drilling becomes increasingly complex, the importance of collecting and analyzing downhole data about the formation increases. Well logging instruments are often used to probe subsurface formations to determine formation characteristics.

The basic techniques for electromagnetic logging for earth formations are well known. For instance, induction logging to determine resistivity (or its inverse, conductivity) of earth formations adjacent a borehole has long been a standard and important technique in the search for and recovery of hydrocarbons. Generally, a transmitter transmits an electromagnetic signal that passes through the borehole and the formation materials around the borehole and induces a signal in one or more receivers. The properties of the signal received, such as its amplitude and/or phase, are influenced by the formation resistivity, enabling resistivity measurements to be made. The measured signal characteristics and/or formation properties calculated therefrom may be recorded as a function of the tool's depth or position in the borehole, yielding a formation log that can be used to analyze the formation.

Sonic tools are an example of well logging tools that may be used to provide information regarding subsurface acoustic properties that can be used to analyze the formation. This information may include the compressional wave speed, shear wave speed, borehole modes, and formation slowness. The information obtained by acoustic measurements has a number of applications, including, but not limited to, seismic correlation, petrophysics, rock mechanics and other areas.

During a typical sonic logging of a formation, an acoustic logging instrument or tool is lowered into a borehole that transverses the formation of interest. The acoustic logging tool may be mounted to the drill collar or other devices and directed downhole. Conventional acoustic logging tools include acoustic transducer elements such as a piezoelectric element. Generally, the acoustic transducer can convert electric energy to acoustic energy as well as acoustic energy to electric energy and may act as an acoustic source or an acoustic sensor. The acoustic logging tool typically includes a transmitter which performs as an acoustic source and emits acoustic energy into the formation and one or more receivers or acoustic sensors that receive acoustic energy. Once the acoustic logging tool is lowered into the formation, the transmitter may be periodically actuated to emit pulses of acoustic energy into the borehole. The emitted acoustic waves propagate through the borehole wall producing a reflection that is then detected by the receiver(s) which may produce an electric signal in response. Specifically, the pressure waves generated by the transmitted may be recorded at the receiver(s). Attributes of the acoustic energy that is detected at the receiver(s) may then be used to characterize subsurface properties of the formation of interest such as compressional slowness and shear slowness.

However, due to the presence of the borehole, the formation properties such as compressional slowness and shear slowness can only be measured indirectly, by relating them to the measured characteristics of the borehole modes. Accordingly, acoustic logging tools are typically designed to excite borehole modes in a way that optimizes recovery of formation parameters. Specifically, the acoustic tools may use signals covering a narrow range of frequencies ("narrow band signals") or signals covering a wide range of frequencies ("broadband signals"). Most commercial borehole acoustic tools utilize broadband excitation functions that can optimally excite a wide range of different formation properties. In borehole acoustic sensing, broadband sources can provide information about multiple frequencies at the same time. This is usually important since the optimal frequency of excitation for a particular formation is typically unknown. Processing of broadband data, however, has many challenges. For instance, time semblance may suffer from interference of different frequencies and frequency semblance may be computationally expensive and sensitive to noise and other effects.

BRIEF DESCRIPTION OF THE DRAWINGS

FIG. 6A shows the formation slowness as a function of frequency associated with different formation parameters, for an exemplary borehole model with borehole radius r=4.934 inch, mud slowness $s_m$=200 μs/ft, and mud density $d_m$=1200 kg/m$^3$.

FIG. 7 shows the worst case formation delay for the exemplary system of FIG. 6A and FIG. 6B.

FIG. 8 shows the excitation delay, formation delay, target delay and the required filter delay calculated for the formation property set of FIG. 6A and FIG. 6B.

FIG. 9 shows method steps for designing a filter in accordance with an exemplary embodiment of the present invention.

Figure 1:
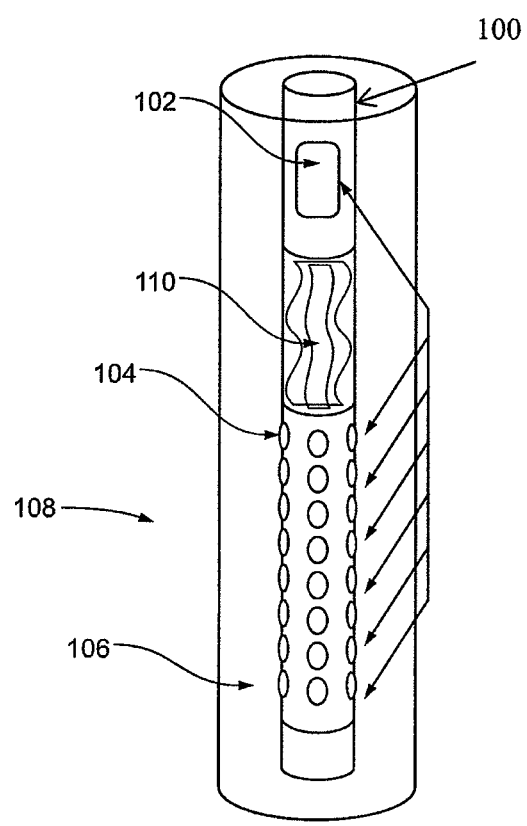
FIG. 1 illustrates an exemplary acoustic tool which may be used in conjunction with an embodiment of the present invention.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. Devices and methods in accordance with certain embodiments may be used in one or more of wireline, measurement-while-drilling (MWD) and logging-while-drilling (LWD) operations. "Measurement-while-drilling" is the term generally used for measuring conditions downhole concerning the movement and location of the drilling assembly while the drilling continues. "Logging-while-drilling" is the term generally used for similar techniques that concentrate more on formation parameter measurement.

Improved time based processing of broadband data are disclosed herein. Specifically, in one exemplary embodiment, the processing is based on a specially designed delay filter that can move different frequency contributions differently in time.

The methods disclosed herein utilize delay filters to improve time-semblance processing of broadband borehole acoustic data. Delay filters are designed to have a certain delay characteristic as a function of frequency and they can serve several purposes. For instance, delay filters can move low frequencies backwards in time relative to high frequencies with large enough separation to produce frequency-semblance-like time-semblance images. These images do not suffer from the same frequency interference problems that are observed in images from regular time-semblance images of broadband signals. They can also be used for quality control purposes, since low signal to noise frequency intervals become more localized and consistent. In one exemplary embodiment, it is also possible to relate the time axis to the frequency axis to produce a quasi-frequency semblance plot. Furthermore, a dispersion corrected time-semblance plot can simply be obtained by using a simple mapping. In one exemplary embodiment, the delay filter may be used to make the results equivalent to that of a different excitation. For instance, source excitation may deliver high frequencies first and low frequencies last. However, some processing methods may require low frequencies first. In such instances, a delay filter may be used to interchange positions of high and low frequencies and make the processing methods available to that data.

Turning now to FIG. 1, an exemplary acoustic tool which may be used in conjunction with the methods described herein is generally denoted with reference numeral 100. As would be appreciated by those of ordinary skill in the art, the present methods are not limited to any specific type or configuration of acoustic tool(s) and the acoustic tool of FIG. 1 is merely used for illustrative purposes.

The tool 100 may be positioned within a borehole 106 in a formation of interest 108 and may include one or more transmitters 102 that may be used to generate pressure waves that travel down the borehole. These pressure waves may then be received by one or more receivers 104 which may be separated from the transmitter by an isolator 110. As would be appreciated by those of ordinary skill in the art, with the benefit of this disclosure, multiple transmitters may be used simultaneously to generate waves with different polarity. For instance, a flexural wave may be generated by using opposite excitation polarities on two sides of the tool 100. Flexural waves are sensitive to shear slowness ($s_s$) of the formation, especially at low frequencies. A monopole signal may be generated by using the same polarity on both sides of the tool 100, or by using an axially symmetric transmitter such as a ring. As would be appreciated by those of ordinary skill in the art, with the benefit of this disclosure, a monopole signal may produce Stoneley mode for low frequencies, compressional wave slowness ($s_c$) and refracted shearwave at higher frequencies.

In all types of excitations, transmitter 102 is activated by sending an electrical or electromagnetic pulse and receiver 104 voltage recording is activated at or after transmitter 102 activation. The recording commences for a preset time that allows listening for required modes. The analog received signal may be digitized and converted to a digital signal with a certain sampling rate and quantization. The digital signal may then be processed downhole or may be transmitted from within the borehole to the surface via a telemetry system. The digital signal may be processed by an information handling system to obtain parameters related to tool, borehole, formation, or any other feature of interest.

As would be appreciated by those of ordinary skill in the art, with the benefit of this disclosure, the signals received at the receivers 104 may be indicative of a number of properties such as, for example, mud compressional slowness within the borehole ($S_{cm}$), mud density within the borehole ($d_m$), borehole radius (r), formation compressional slowness ($S_c$), formation shear slowness ($S_s$) and formation density (d).

With array type receivers 104, time-semblance or frequency-semblance processing may be used to obtain a two-dimensional ("2D") image of slowness with respect to time or frequency, respectively. Based on the mode of interest, a slowness pick is made from the semblance results. If required, a correction is applied to account for possible effects such as frequency dispersion. As the tool is moved in the borehole, this process is repeated and a log of slowness values with respect to depth may obtained. Alternatively, a Variable Density Log ("VDL") image can be constructed by reducing the 2D semblance image to one-dimensional ("1D") by various methods and plotting all the 1D images as a function of depth. Finally, an operator may view the log and make drilling/production decisions based on it. Inaccurate slowness measurements can lead to wrong decisions which may increase operating costs significantly.

Figure 2:
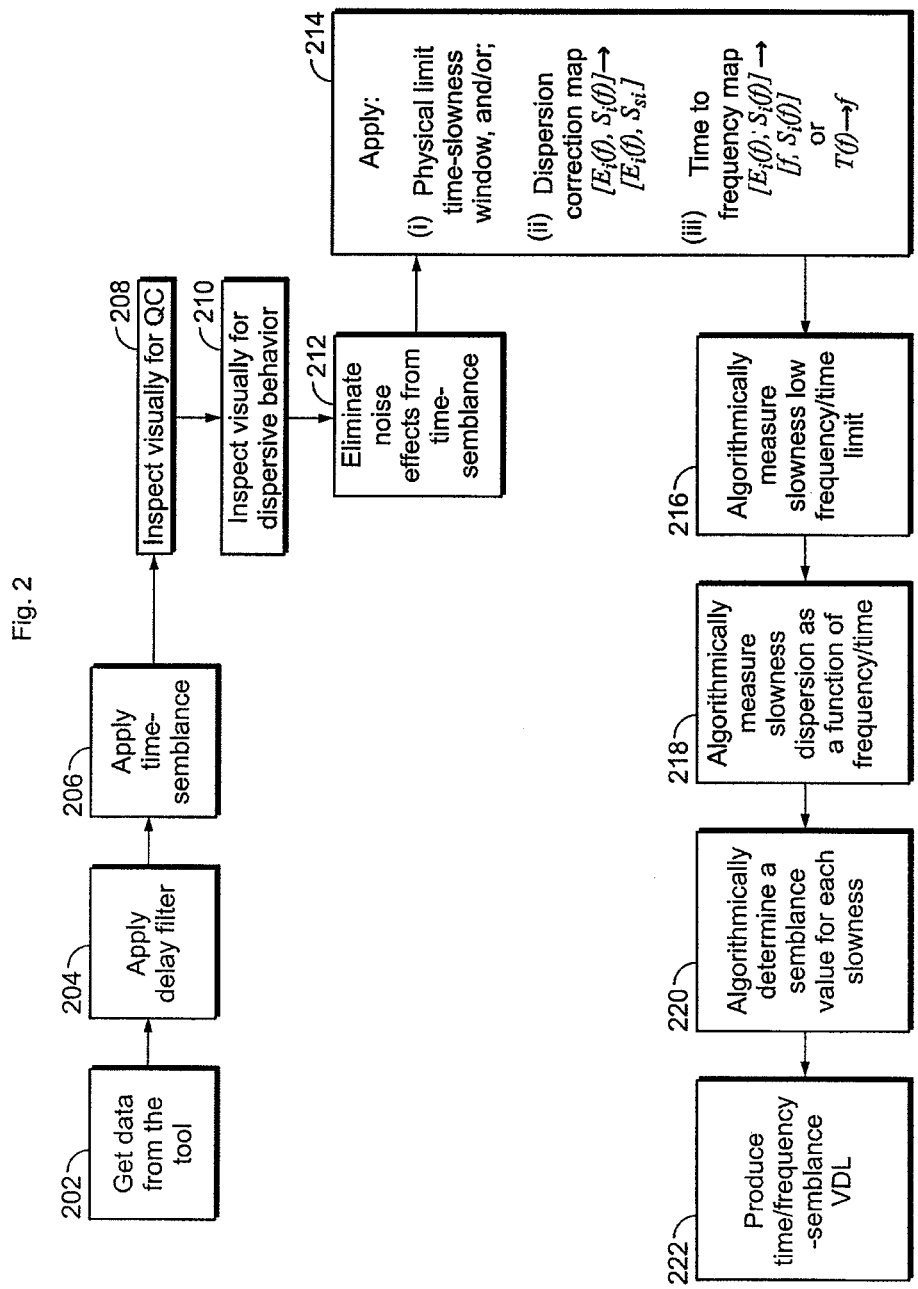
FIG. 2 illustrates method steps for processing data obtained from a logging tool in accordance with an exemplary embodiment of the present invention.

FIG. 2 depicts method steps in accordance with an exemplary embodiment of the present invention. At step 202, data is obtained from a tool, such as the tool 100. Next, before performing any further processing on the data, the data is passed through a delay filter at step 204. Specifically, a delay filter is set that can separate different frequencies in time. The data obtained at step 202 is then passed through the filter. As would be appreciated by those of ordinary skill in the art, with the benefit of this disclosure, different filters may be used to optimally serve different purposes. For example, filters that produce large delay difference between low and high frequencies may be used for frequency-semblance-like visualization. Alternatively, delay difference may be adjusted to values that optimize time-semblance processing. Multiple filters may be used for the same data set. The filter may be applied as an analog filter before the Analog to Digital ("A2D") converter, or it can be applied as a digital filter after the A2D converter. In most applications, the same filter is applied to all receiver channels. However, different filters may also be applied.

Figure 13:
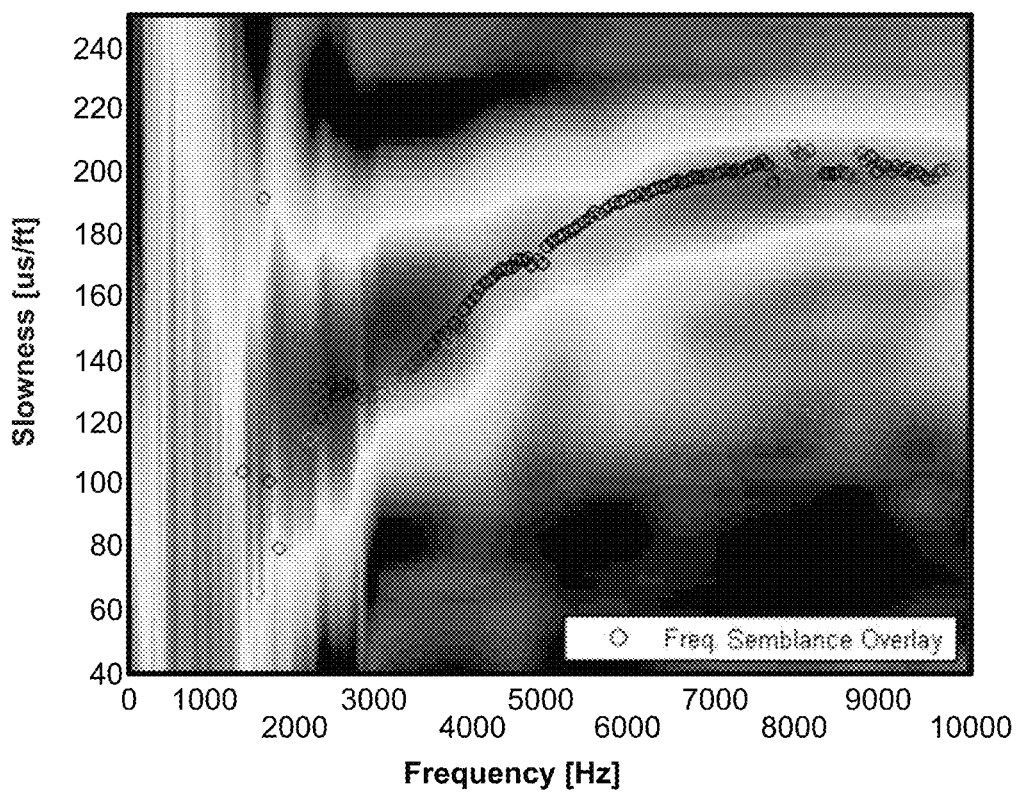
FIG. 13 shows a quasi-frequency semblance obtained in accordance with an exemplary embodiment of the present invention.

After filtering, at step 206, the data may be processed by a standard time-semblance algorithm to produce a 2D time-slowness image. In one embodiment, at step 208 the image produced at step 206 may be visualized and inspected for quality control or diagnostics. This visualization may be performed on the surface. In one embodiment, the image may also be visually inspected for dispersive behavior at step 210. In case a large enough delay separation is produced between low and high frequencies, dispersive behavior of the signal can be visualized in time or mapped frequency. FIG. 13, which is discussed in more detail below, shows an example of such a visualization.

In order to algorithmically measure slowness from the 2D image, several processing steps may be performed. First, at step 212, the noise effect can eliminated from time-semblance to obtain a substantially noise-free signal, referred to herein as a "clean signal." As would be appreciated by those of ordinary skill in the art, with the benefit of this disclosure, a number of methods may be used to eliminate the noise effect, such as, for example, time- and/or slowness-windowing, band-pass filtering and filtering in depth dimension. In order to further eliminate signals that are not originating from the formation, a physical limit time-slowness window may then be applied at step 214. Further, in one exemplary embodiment, a dispersion correction map and/or a time to frequency map may also be applied at step 214. The dispersion correction map is a map from a time-semblance image to a dispersion corrected time-semblance image. The time to frequency map associates time axis of signal with frequency of the arrivals that are expected at that time. This window may be constructed by considering all possible formation responses and determining an area in time-slowness domain where the actual physical signal is expected. Accordingly, a map that associates each point in 2D time semblance time-slowness [t,s] result to actual formation slowness ($s_s$) can be constructed and applied ([t,s]→[t,$s_s$]). This effectively corrects for the effect of dispersion. The details of the dispersion correction map and the time to frequency map are discussed in more detail below. Further, this correction is demonstrated in, for example, FIGS. 15B and 15C which are discussed in more detail below.

Finally, a number of additional optional steps may be performed. For instance, standard time-based picking methods can be applied to the resulting 2D slowness-time image to measure slowness values at step 216. At step 218, a dispersion curve may also be obtained as a function of time, which can be converted to a function of frequency by taking advantage of known filter and excitation delays and expected formation delays as discussed in more detail below.

A semblance value may be determined for each slowness value at step 220 and an associated 1D function can be obtained at each depth. These 1D functions can be augmented in depth to produce a so-called VDL image of time-semblance at step 222.

Figure 3:
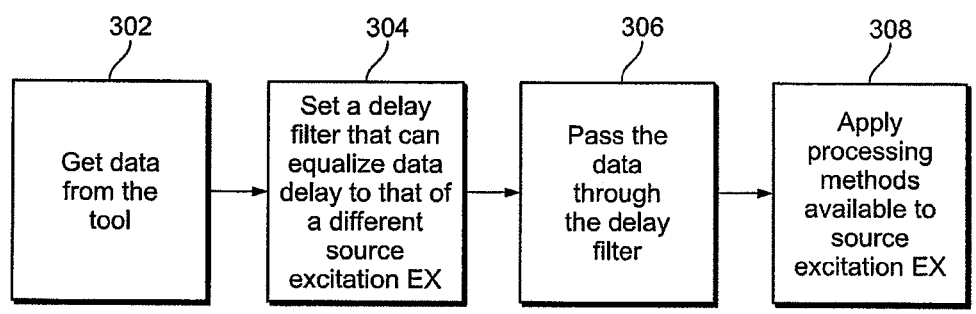
FIG. 3 illustrates method steps for processing data obtained from a logging tool in accordance with another exemplary embodiment of the present invention.

FIG. 3 depicts method steps in accordance with another exemplary embodiment of the present invention. In this embodiment, data is obtained from the tool 100 at step 302. Next, at step 304, a delay filter is set that can equalize the delay of the source excitation to a second source excitation, so that methods available to the second excitation can be safely applied. For instance, data from a chirp type of source excitation that has high frequencies first in time, may be passed through the filter to produce a data equivalent to that produced with a low frequency's first excitation. The data may then be passed through the delay filter at step 306. Finally, at step 308, a standard processing algorithm that expects low frequencies first can be used on the filtered data. In one exemplary embodiment, the processing algorithm may be an anisotropy algorithm that was designed for broadband excitations.

Although a number of steps are depicted in FIGS. 2 and 3, as would be appreciated by those of ordinary skill in the art, one or more of the depicted steps are optional and not essential to the methods disclosed herein.

The design of a delay filter in accordance with an exemplary embodiment of the present invention will now be discussed in more detail. There are two types of delay definitions available for linear time-invariant systems: phase delay and group delay. The former is usually a better choice to measure the local delays in the waveform and the latter for measuring delays in an envelope of the signal. Because in acoustic application the modes appear as packets in time, group delay is a good choice. However phase delay may also be used in cases where measurement of interest is not a wave packet.

Figure 4:
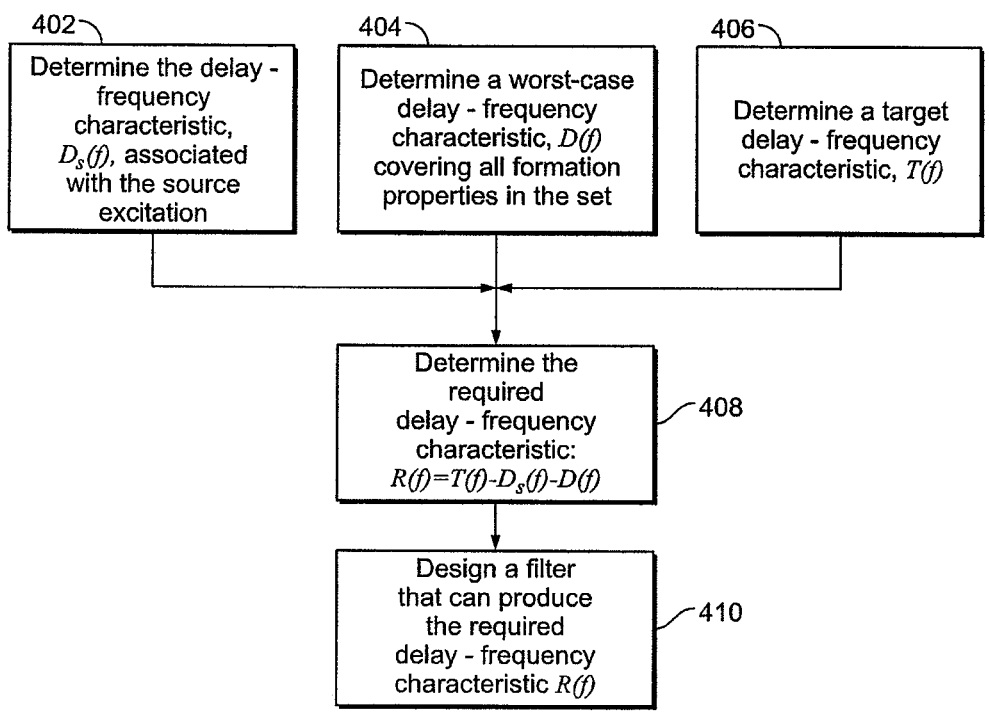
FIG. 4 shows method steps for designing a delay filter in accordance with an exemplary embodiment of the present invention.

FIG. 4 depicts method steps for designing a delay filter in accordance with an exemplary embodiment of the present invention. Specifically, the method of FIG. 4 may be used to calculate the required filter delay, $R(f)$, that can produce a target delay, $T(f)$, in the received signal. The delay in the received signal can be related to others as $T(f)=D_s(f)+D(f)+R(f)$, where $D_s(f)$, $D(f)$ and $R(f)$ are the delays associated with the source, formation (worst-case-equivalent) and the required filter, respectively. In order to calculate the required filter delay, the equation can be written as:

$$R(f)=T(f)-D_s(f)-D(f) \quad (1)$$

Figure 5A:
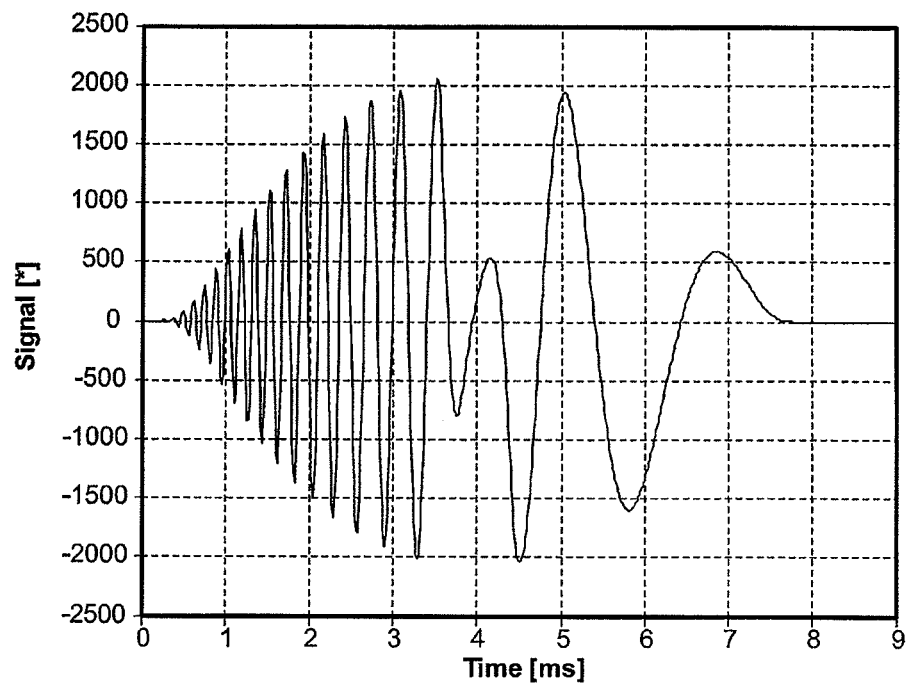
FIGS. 5A and 5B illustrate the waveform and associated delay for a chirp type source of excitation.
Figure 5B:
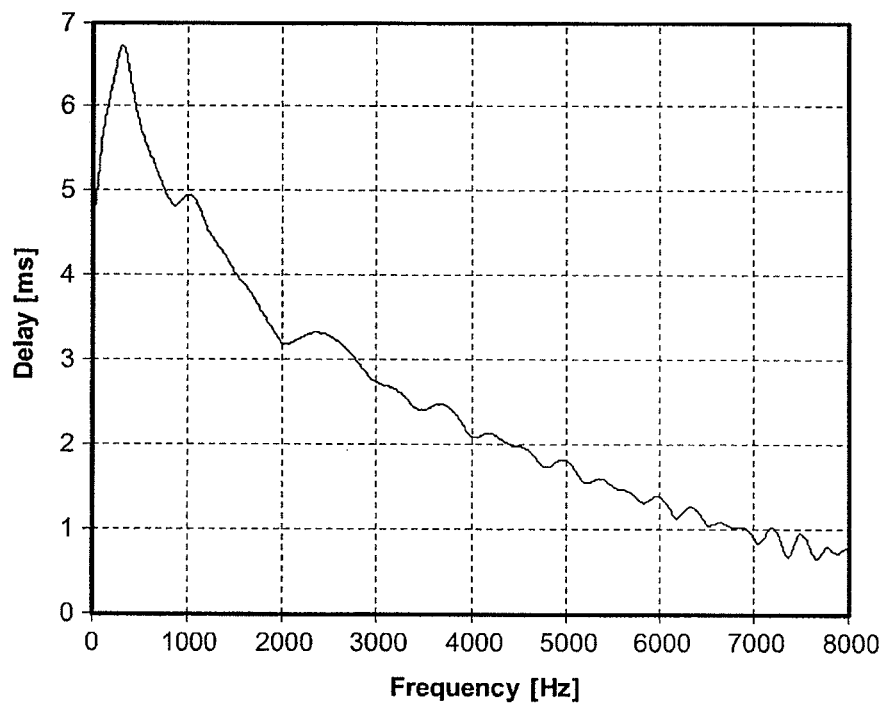

Accordingly, at step 402, the delay frequency characteristic, $D_s(f)$, associated with the source excitation is determined. FIGS. 5A and 5B depict the waveform and associated delay, respectively, for a chirp type source of excitation.

As shown in FIG. 5B, the delay is a function of frequency and the source produces higher delay at low frequencies. The calculation of the source excitation delay, $D_s(f)$, is based on the standard group delay calculation. The details of this calculation are well known to those of ordinary skill in the art and will therefore not be discussed in detail herein.

Returning now to FIG. 4, at step 404, the worst case formation delay frequency characteristic, $D(f)$, is determined. $D(f)$ is due to propagation of pressure waves in the formation which can not be determined exactly since it is a function of the slowness that the tool is aiming to measure. As a result, a worst case $D(f)$ may be used to safely cover all possible scenarios. In order to determine $D(f)$, a set of expected formation properties are first determined. Formation delay is a function of formation slowness and may be calculated as $D_i(f)=z_{T2R} \times S_i(f)+\gamma(f)$, where $z_{T2R}$ is the distance between the transmitter and the reference receiver, $S_i(f)$ is the slowness frequency characteristic associated with the mode of interest, and $\gamma(f)$ is additional delays due to borehole thickness and shape, etc. Accordingly, in order to determine the worst case delay, $D(f)$, the slowness frequency characteristic $S_i(f)$ associated with each formation property is first determined. Next, the delay frequency characteristic, $D_i(f)$, associated with each formation property is determined and the delay frequency characteristic, $D_i(f)$, is used to determine the worst case delay frequency $D(f)$ covering all the formation properties of interest. In order to design a filter that can handle the worst case for all possible scenarios, delay separation associated with each mode is calculated as the derivative of delay with respect to frequency. Specifically, once the delay frequency characteristic, $D_i(f)$, associated with each formation property is known, a separation frequency characteristic, $P_i(f)$, for all formation properties in the set may be determined as:

$$P_i(f) = \frac{dD_i(f)}{df} \quad (2)$$

The worst case delay frequency characteristic, $D(f)$, for all formation properties in the set may then be selected to be at least as large as the maximum of all the different separations, $P_i(f)$:

$$D(f) \approx \max_i (P_i(f)) \quad (3)$$

Figure 6B:
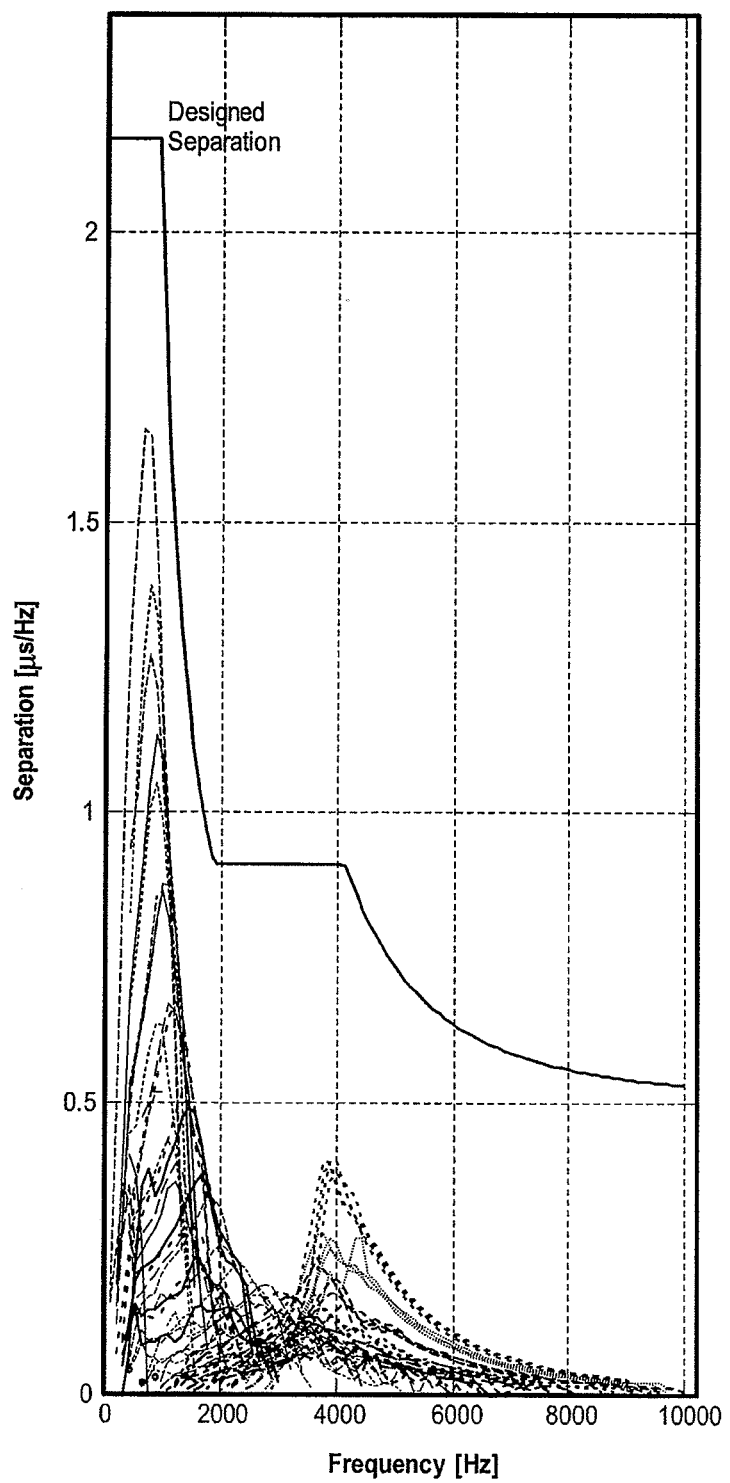
FIG. 6B shows the formation separation associated with each mode of FIG. 6A.

FIG. 6A shows the formation slowness as a function of frequency associated with different formation parameters, for an exemplary borehole model with borehole radius r=4.934 inch, mud slowness $s_m$=200 µs/ft, and mud density $d_m$=1200 kg/m³. As would be appreciated by those of ordinary skill in the art, with the benefit of this disclosure, the selected values or used for illustrative purposes only. Accordingly, different values may be used for the formation properties without departing from the scope of the present invention. Slowness axis is presented on the left-hand side of FIG. 6A and the formation delay axis is on the right-hand side. As shown in FIG. 6A, each case requires different delay and relative separation between different frequencies. The delay separation associated with each mode of FIG. 6A is shown in FIG. 6B.

A separation that is larger than all others is then determined. In the example of FIG. 6A, this is designated as "Designed Separation" in FIG. 6B. Once the designed separation is determined, the worst case formation delay, $D(f)$, may be obtained by integrating the designed separation in frequency. FIG. 7 depicts the worst case formation delay for the exemplary system of FIG. 6B.

Delay filters are not necessarily specific to certain formation types of excitation functions, and may be designed for the worst case and/or arbitrary source excitation function. However, more efficient delay filters may obtained by designing specifically for certain excitation functions and formation types. For example, the total range of delay and filter length can be reduced if filter is designed to work with a limited range of slowness values.

Finally, at step 406, a target delay frequency characteristic, $T(f)$, may be determined. The target delay depends on the application being pursued. In the case where the aim is to obtain a frequency-semblance-like time-semblance image, it may be advantageous to design a delay that is directly proportional to the frequency. For instance, in one exemplary embodiment:

$$T(f) = \begin{cases} f/10000 - 0.003 & \text{if } f < 3000 \\ f/100000 + 0.025 & \text{else} \end{cases} \quad (4)$$

Alternatively, in instances where the aim is to produce a signal with fixed number of periods per each frequency interval, delay may be made inversely proportional to the frequency. For instance, in one exemplary embodiment:

$$T(f) = \begin{cases} 0.002 - 6/f & \text{if } f < 500 \\ -0.014 + 0.00001 f & \text{else} \end{cases} \quad (5)$$

In the case where the aim is to make the signal delay equivalent to that of a different source excitation, EX, target delay can be chosen as $T(f)=D_{s2}(f)+D(f)$, where $D_{s2}(f)$ is the source excitation delay associated with EX.

Once the delay frequency characteristic, $D_s(f)$, associated with the source excitation, the worst case delay frequency characteristic, $D(f)$, covering all the formation properties in the set, and the target delay frequency characteristic, $T(f)$, are determined at steps 402, 404, and 406, respectively, the required delay frequency characteristic, $R(f)$, may be determined at step 408, using the relationship of Eq. (1). Finally, at step 410, one can design a filter that can produce the required delay-frequency characteristic $R(f)$.

FIG. 8 shows the excitation delay, formation delay, target delay and the required filter delay calculated for the set of formation properties of FIG. 6A and FIG. 6B. As would be appreciated by those of ordinary skill in the art, with the benefit of this disclosure, a delay filter may be produced in several different ways, such as, for example, by using an analytical expression such as a chirp; by deconvolution of a signal from another signal of different delay; and by using all-pass filters. The use of all-pass filters may be particularly useful in acoustic applications as it has a flat amplitude response in frequency and does not reduce or amplify any frequency range.

Figure 10:
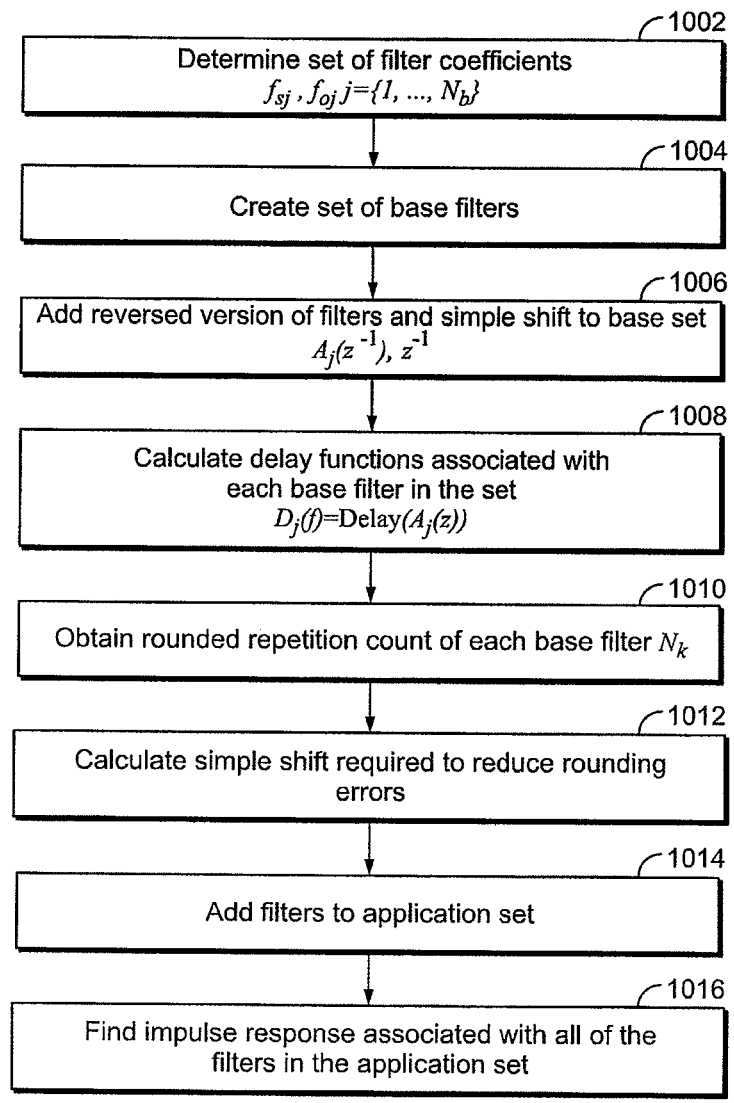
FIG. 10 shows method steps for designing a filter in accordance with another exemplary embodiment of the present invention.

FIGS. 9 and 10 depict two exemplary methods for designing a filter in accordance with an exemplary embodiment of the present invention. Turning now to FIG. 9, first, at step 902, a set of filter coefficients are determined, with $N_b$ denoting the number of base filters used. The filter coefficients, ($f_0$ and $f_s$) are, in general, chosen from a grid that is bounded by the maximum frequency of interest. In one exemplary embodiment, a combination of about 25 uniformly distributed $f_0$ points and 25 uniformly distributed $f_s$ points may be adequate. After set of coefficients are determined, at step 904, a set of base filters are created in the discrete z-transform domain using the following equations:

$$z_{pj} = e^{i2\pi(f_{0j}+if_{sj})} \quad (6)$$

$$A_j(z) = \frac{z_{pj} z_{pj}^* - (z_{pj} + z_{pj}^*) z^{-1} + z^{-2}}{1 - (z_{pj} + z_{pj}^*) z^{-1} + z_{pj} z_{pj}^* z^{-2}} \quad (7)$$

Where: $z_{pj}$ represents the pole associated with coefficients $f_{0j}$ and $f_{sj}$; i represents a complex number (square root of $-1$); $f_{0j}$ is used for damping delay behavior; $f_{sj}$ controls where the delay bend; $A_j(z)$ represents the z-transform of base filter; and * represents the conjugation operation.

Since all-pass filters produce delay only in a single direction, it is required to add reversed version of filters $A_j(z^{-1})$ at step 906. It is also useful to add a simple shift delay $z^{-1}$ to the base set. After the base set is complete, delay functions associated with each filter in the set, $D_j(f)$, is calculated at step 908. Next, an application set is created an initialized to an empty set at step 910. Then the base filter that maximally reduces the difference between the total delay in the application set and required filter delay is found at step 912, using the equation:

$$j_{new} = \underset{k}{\operatorname{argmin}} \left\{ \int \left( R(f) - D_k(f) - \sum_j D_j(f) \right)^2 df \right\} \quad (8)$$

where $j_{new}$ represents the new candidate filter that minimizes the difference between the total delay in the application set and the required delay.

The "new" filter obtained at step 912 is added to the base filter application set at step 914. At step 916 it is determined if the process should be repeated. Specifically, following step 916, the process is returned to step 912 unless no base filter can reduce the difference between the total delay in the application set and the required delay, or a preset maximum number of iterations is reached. Once a decision is made not to return to step 912, the process will continue to step 918. At step 918, an impulse response associated with a combination of all filters in the application set is calculated by convolving the filters in time using the following equation:

$$h[n] = Z^{-1}(A_{x_1}(z)) * Z^{-1}(A_{x_2}(z)) * \ldots * Z^{-1}(A_{x_N}(z)) \quad (9)$$

where $h[n]$ is the impulse response, $A_{xi}$ represents the i'th filter in the application set, * is the convolution operator and $Z^{-1}$ is the inverse Z-transform.

As would be appreciated by those of ordinary skill in the art, with the benefit of this disclosure, although it is possible to combine the filters in z-domain by multiplying them to avoid convolution, this may produce large order polynomials and associated numerical problems.

Turning now to FIG. 10, a method for designing a delay filter in accordance with another exemplary embodiment of the present invention is generally depicted. First, at step 1002 a set of filter coefficients are determined; at step 1004 a set of base filters are created; at step 1006 a reversed version of the filters is added and a simple shift is made to the base set; and at step 1008 a delay function associated with each base filter in the set is calculated. Steps 1002, 1004, 1006, and 1008 are analogous to steps 902, 904, 906, and 908 discussed in conjunction with FIG. 9 above and will therefore not be discussed in detail. In accordance with this embodiment, the design is based on a non-iterative procedure. Accordingly, a repetition count of each base filter, $N_k$, is directly obtained via matrix inversion followed by rounding at step 1010, using the following equation:

$$N_k = \operatorname{round}(\operatorname{pseduoinverse}([D_1(f) \ldots D_N(f)])R(f) \quad (10)$$

Some portion of the errors introduced by rounding can be removed via applying a simple shift at step 1012 using the following equation:

$$n_{shift} = \operatorname{round}\left(\frac{1}{(f_1 - f_0)D_\Delta} \int_{f_0}^{f_1} [D_1(f) \ldots D_N(f)]N_k - R(f) df\right) \quad (11)$$

where $n_{shift}$ is the applied shift and $D_\Delta$ represents the sampling interval of the digital signal (1/ sampling frequency). The filters obtained may then be added to the application set, X, at step 1014 as follows:

$$X = \left\{ \frac{A_1(z), \ldots A_1(z),}{N_1} \quad \frac{A_2(z), \ldots A_2(z),}{N_2} \quad \frac{A_N(z), \ldots A_N(z)}{N_N} \right\} \quad (12)$$

Negative counts can be interpreted as positive counts with filters reversed in time $A_j(z^{-1})$. Finally, the impulse response is calculated at step 1016 by populating the application filter set with k-th filter $N_k$ times. Specifically, the impulse response associated with all of the filters in the application set may be expressed as:

$$h[n-n_{shift}] = Z^{-1}(A_{x_1}(z)) * Z^{-}(A_{x_2}(z)) * \ldots * Z^{-1}(A_{x_N}(z)) \quad (13)$$

Figure 11:
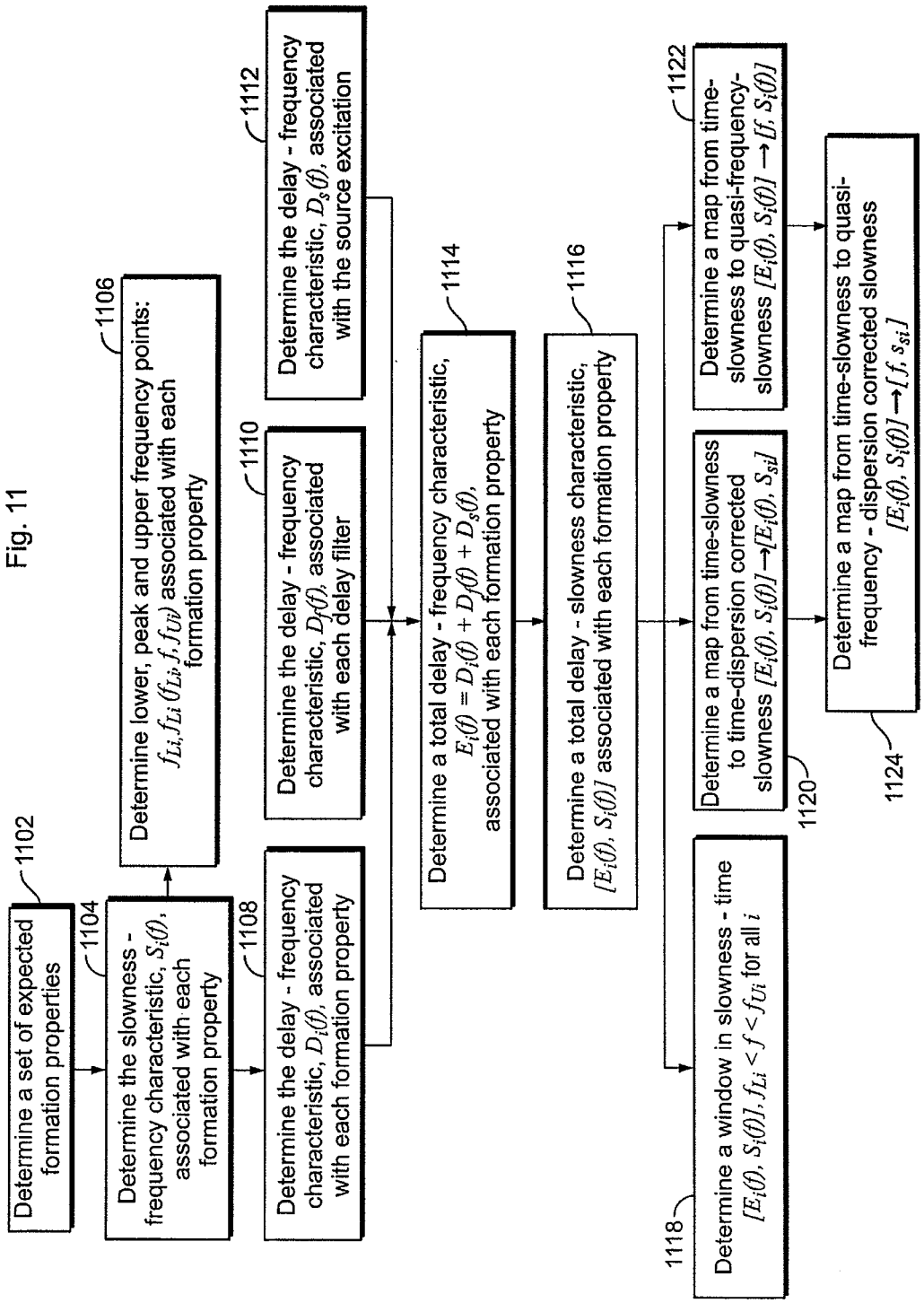
FIG. 11 depicts a methodology to determine the time-slowness window and a map that relates each time-slowness point to a formation property, in accordance with an exemplary embodiment of the present invention.

Since the source excitation, filter and delay limits of desired modes are all known, it is possible to determine a time-slowness window in the time semblance where the desired mode is expected. This not only reduces the processing time, but also eliminates noise and other unwanted effects. FIG. 11 depicts a methodology to determine the time-slowness window and a map that relates each time-slowness point to a formation property, in accordance with an exemplary embodiment of the present invention. First, at step 1102, a set of expected formation properties which covers all possible scenarios given the a-priori information is determined. Next, at step 1104, a slowness-frequency characteristic $S_i(f)$ associated with each formation property i is determined. This can be accomplished by utilizing equations, using analytical or numerical modeling, or using existing data from logging tools.

Next, at step 1106, a lower, peak, and upper frequency point associated with each formation property are determined. The peak frequency, $f_{Pi}$, may be determined by considering the frequency at which the largest mode amplitude is observed. The lower and upper frequencies, $f_{Li}$ and $f_{Ui}$, for each mode can be determined by considering frequencies at which the amplitude becomes weaker than a certain multiple of the peak amplitude. Accordingly, the amplitude and frequency of the peak are first determined. Then a multiple of the peak amplitude is determined, and the associated multiplying factor may be denoted as A. In one exemplary embodiment, A may be 0.1. Finally, starting from the peak frequency, a search is conducted for frequencies where the amplitude is equal to, or lower than A above and below the peak frequency. Then slowness can be converted to delay by utilizing the $D(f) = z_{T2R} \times S_i(f) + \gamma(f)$ which was described above. Specifically, the delay frequency characteristic associated with each formation property, $D_i(f)$, may be obtained at step 1108. Similarly, the delay frequency characteristic, $D_f(f)$, associated with the delay filter and the delay frequency characteristic associated with the source excitation, $D_s(f)$, are determined at steps 1110 and 1112, respectively.

At step 1114, a total delay can be computed by summing delays from source excitation, formation, and the filter, associated with each formation property. Further, the total delay-slowness characteristic associated with each formation property may then be obtained at step 1116 by determining a map from a total delay-slowness point to formation property $[E_i(f), S_i(f)] \rightarrow i$. Considering the area formed by the $[E_i(f), S_i(f)]$, $f_{Li} < f < f_{Ui}$ lines corresponding to all formation properties i, a window in time-slowness can be obtained at step 1118. As described earlier, only semblance values that are inside this window are possibly from formation. It is also possible to correct dispersive effects in the signal by mapping each point $[E_i(f), S_i(f)]$ in the semblance to $[E_i(f), s_{si}]$, where $s_{si}$ is the appropriate slowness associated with formation property i. Specifically, at step 1120, a map from time slowness to time dispersion corrected slowness is obtained as $[E_i(f), S_i(f)] \rightarrow [E_i(f), S_{si}]$. Further, at step 1122 a map from time-slowness to quasi-frequency slowness is determined as $[E_i(f), S_i(f)] \rightarrow [f, S_i(f)]$. Specifically, a quasi-frequency semblance image may be obtained by mapping time axis to frequency axis. The determinations from steps 1120 and 1122 are then used at step 1124 to determine a map from time-slowness to quasi-frequency-dispersion corrected slowness as $[E_i(f), S_i(f)] \rightarrow [f; S_{si}]$.

Figure 12A:
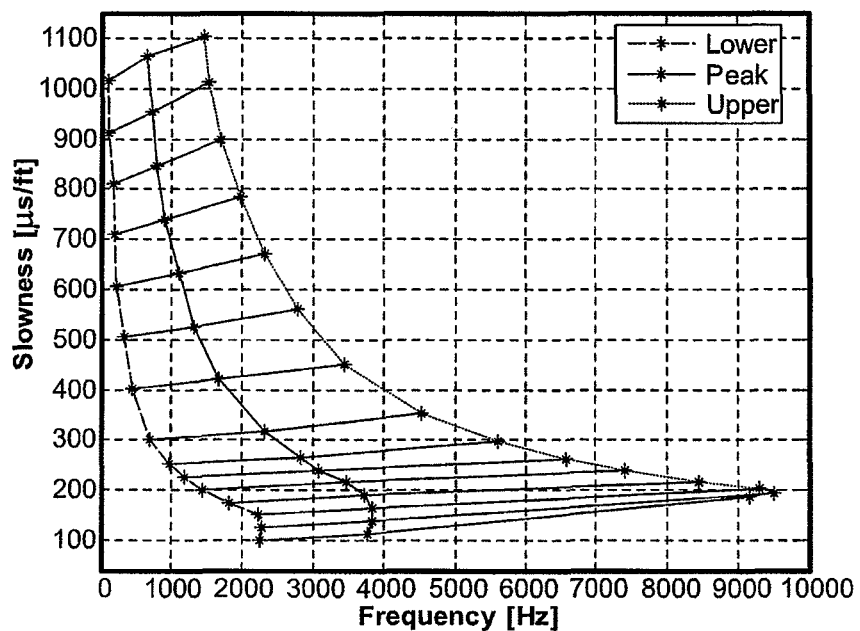
FIG. 12A, FIG. 12B and FIG. 12C show examples of determining slowness-frequency limit, delay-frequency limit, and delay-slowness limit in accordance with an exemplary embodiment of the present invention for the formation property set of FIG. 6A and FIG. 6B.
Figure 12B:
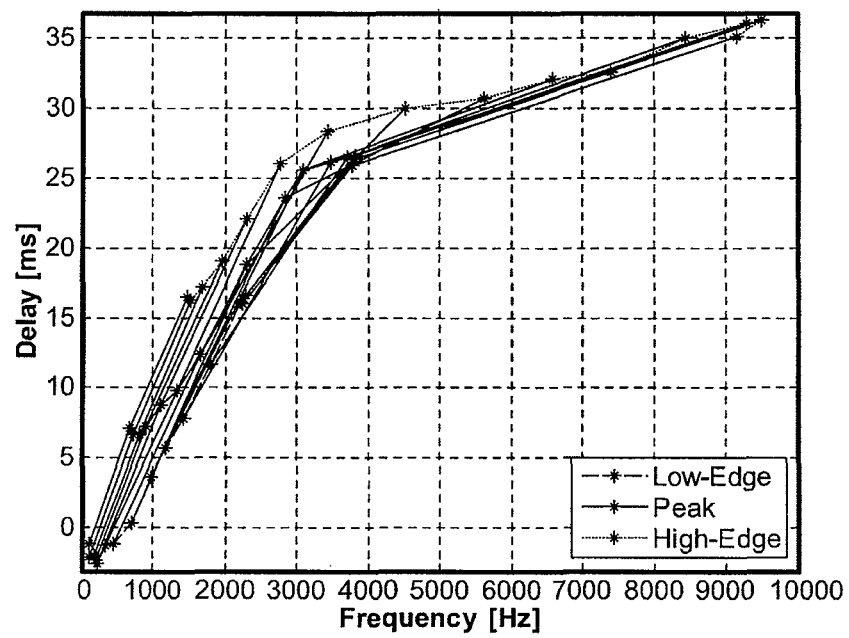
Figure 12C:
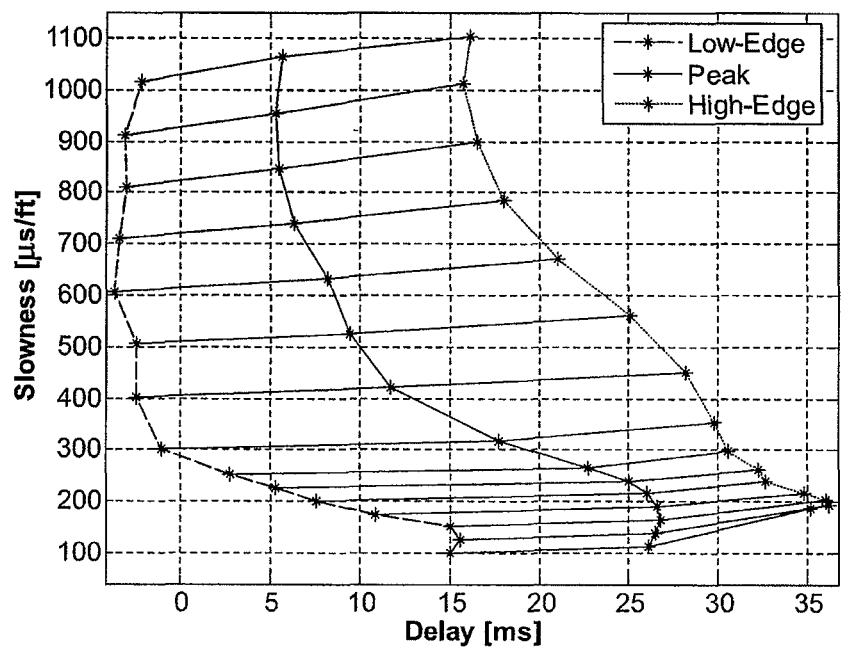

FIG. 12A-12C show examples of determining slowness-frequency limit, delay-frequency limit, and delay-slowness limit in accordance with an exemplary embodiment of the present invention for a system with borehole radius r=4.934 inch, mud slowness $s_m$=200 µs/ft, and mud density $d_m$=1200 kg/m³.

Figure 14:
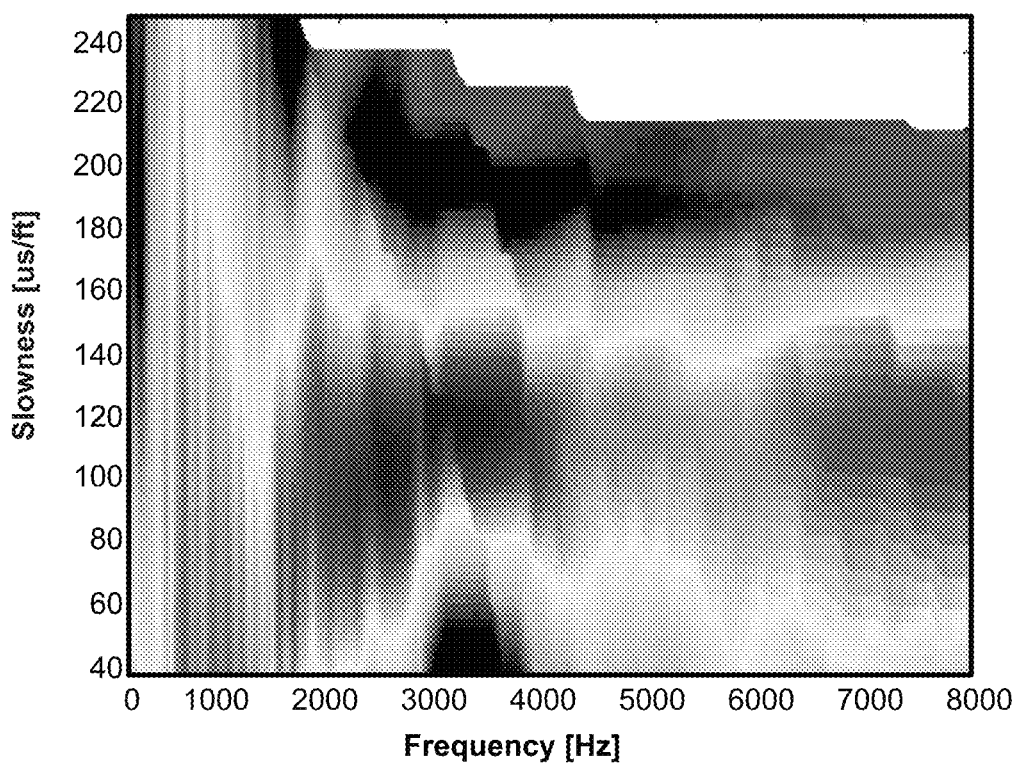
FIG. 14 shows a dispersion corrected quasi-frequency semblance obtained in accordance with an exemplary embodiment of the present invention.

In one exemplary embodiment, a quasi-frequency semblance may be obtained from time semblance by applying the following mapping to the time-semblance map: $[E_i(f), S_i(f)] \rightarrow [f, S_i(f)]$. As long as the formation models used in constructing $S_i(f)$ are valid and unique, this mapping is expected to produce results equal to a frequency-semblance method. In case validity or uniqueness does not exist, an approximate frequency semblance can be obtained. If formation delay is much smaller than filter delay, the time to frequency mapping can be approximated as $T(f) \rightarrow f$. FIG. 13 shows a quasi-semblance that is obtained via this latter mapping. Actual frequency-semblance result is drawn on top in circles. It can be seen that the quasi-semblance successfully reproduces the actual frequency semblance. The small difference in shape is due to discarded formation effects. This provides a simple slowness independent mapping. Finally, it is also possible to obtain a quasi-frequency-dispersion corrected slowness image $[E_i(f), S_i(f)] \rightarrow [f, s_{si}]$ by combining two mappings. FIG. 14 shows result of such mapping. It can be seen that in this exemplary application, slowness at all frequencies are corrected to the actual formation shear slowness around 120 µs/ft.

It will be understood that the equipment and processes described are not limited to use in conjunction with drilling an oil well. The present methods and systems may also be used when drilling natural gas wells or hydrocarbon wells in general. Further, such wells can be used for production, monitoring, or injection in relation to the recovery of hydrocarbons or other materials from the subsurface. Further, the methods disclosed herein may be performed by an information handling system. As would be appreciated by those of ordinary skill in the art, the data obtained at a receiver on the logging tool may be transmitted to the information handling system through a wired or wireless connection. Transmission of data over wired or wireless networks is well known to those of ordinary skill in the art and will not be discussed in detail herein. Moreover, as would be appreciated by those of ordinary skill in the art, the processing methods disclosed herein may be performed downhole, at the well site, at a remote location from the well site, or at any other location that may be suitable for the particular application.

Accordingly, the methods and systems disclosed herein improve time-semblance quality and stability for broadband borehole acoustic data by eliminating frequency interference in time. Further, the methods and systems disclosed herein produce frequency-semblance-like time-semblance images that can be used for diagnostics by support or development personnel. Additionally, such images show and can correct for the dispersive behavior of the signal. Moreover, the methods and systems disclosed herein allow straightforward algorithmic picking of the lowest frequency peak available; allow use of processing methods available to a different excitation; provide efficient implementation in existing tools with a firmware upgrade; and improve measurement of geomechanical properties of subterranean formations and hydrocarbon recovery. Further, the methods and systems disclosed herein enhance quality control by separating weak and strong portions of the spectra in time; allow use of processing methods available to a different excitation; provide efficient implementation in existing tools with a firmware upgrade; and improve measurement of geomechanical properties of subterranean formations and hydrocarbon recovery.

EXAMPLE I

Figure 15A:
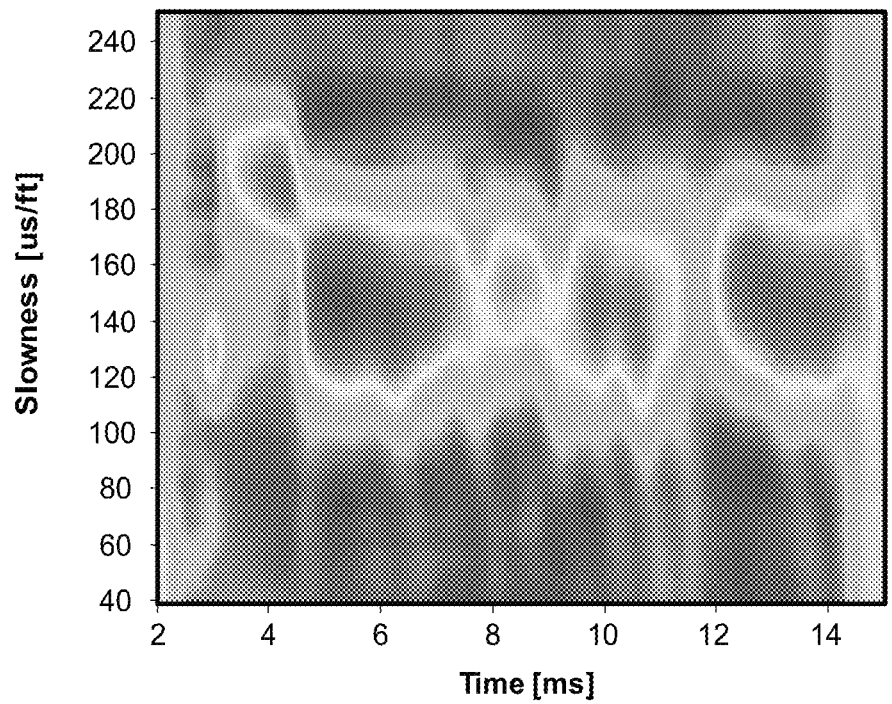
FIG. 15A shows time-semblance results for an exemplary set of data.
Figure 15B:
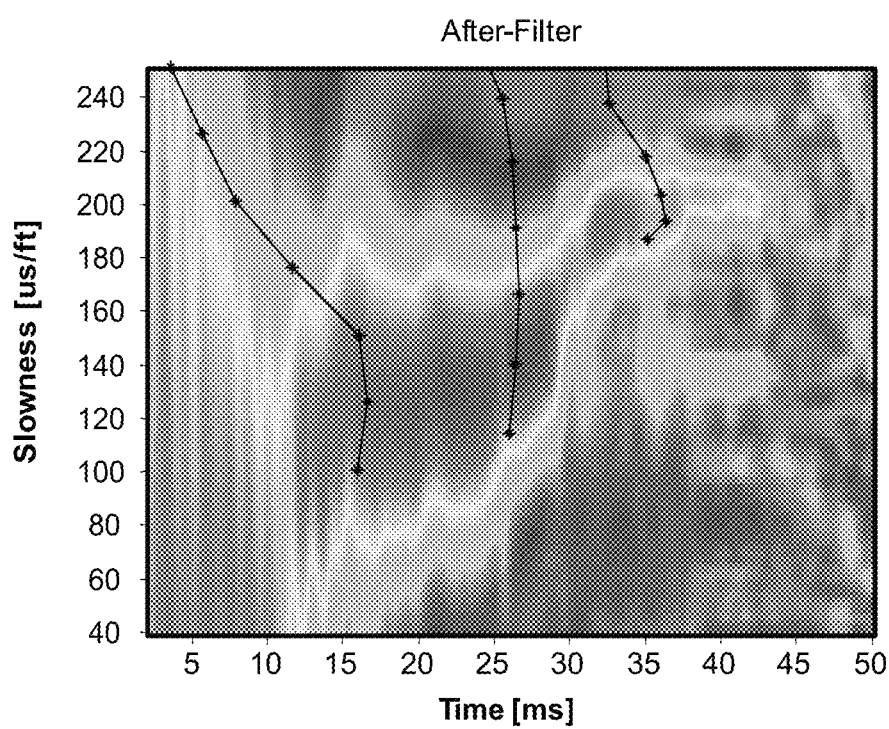
FIG. 15B shows time-semblance results for the exemplary set of data of FIG. 15A after processing data in accordance with an exemplary embodiment of the present invention.
Figure 15C:
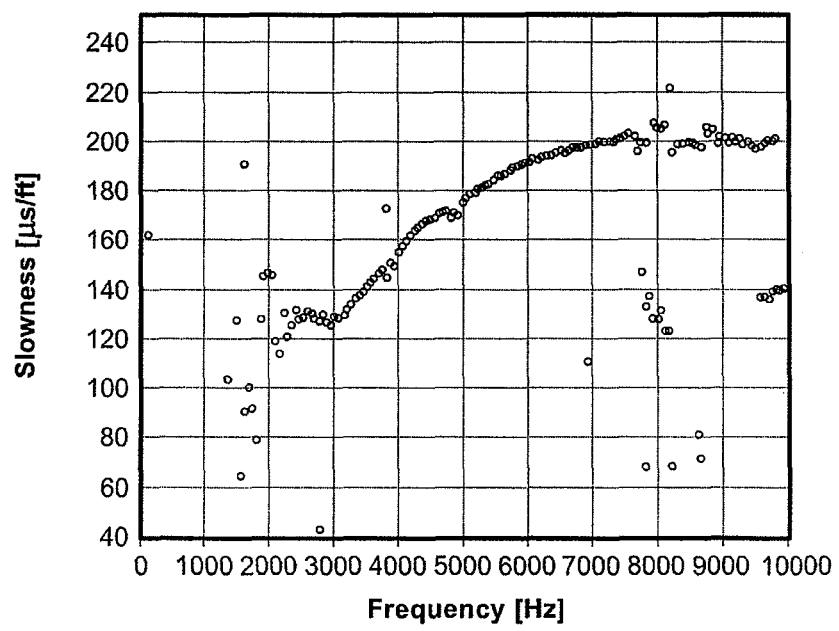
FIG. 15C shows frequency-semblance results for the exemplary set of data of FIG. 15A.

As an example, FIGS. 15A and 15C. show time-semblance and frequency-semblance results for the same data, respectively. It can be seen that time-semblance result shows only two recognizable peaks with distinct slowness, even though the frequency semblance result shows a gradual change. Furthermore time-semblance failed to read the smallest slowness value, which is an application-critical parameter. It can be seen from the processed result in FIG. 15B that a frequency-semblance-like image that is obtained by processing the data in accordance with the methods disclosed herein shows the gradual change and the correct (cut-off) slowness value for the system. Specifically, FIGS. 15A and 15B show a 2D image of slowness with respect to time and frequency, respectively.

Figure 16A:
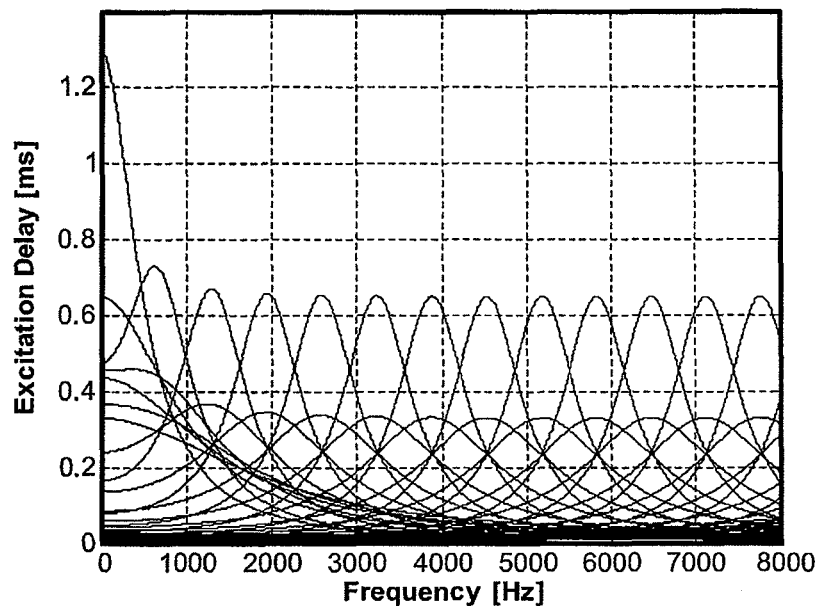
Fig 16A, FIG. 16B, FIG. 16C and FIG. 16D show filter design results associated with the filter used in FIG. 15A, FIG. 15B and FIG. 15C.
Figure 16B:
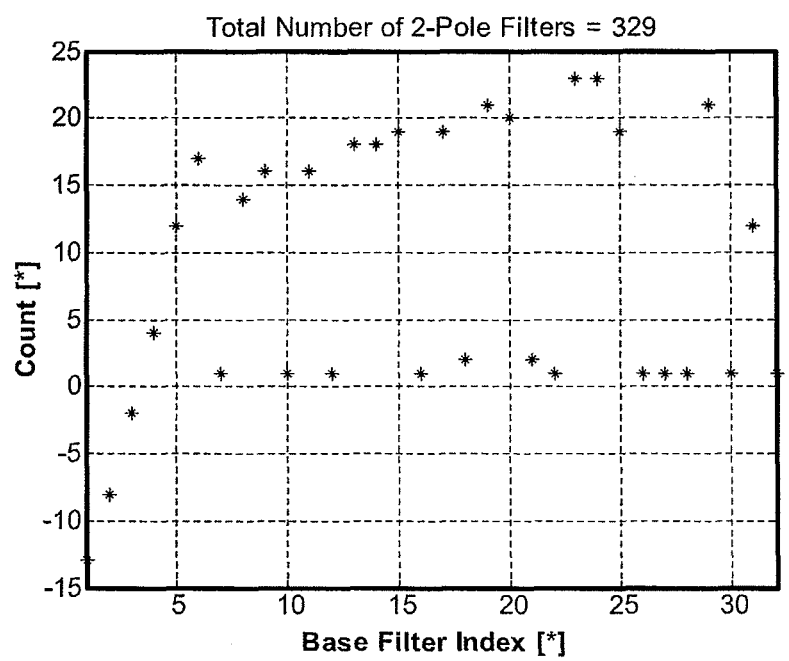
Figure 16C:
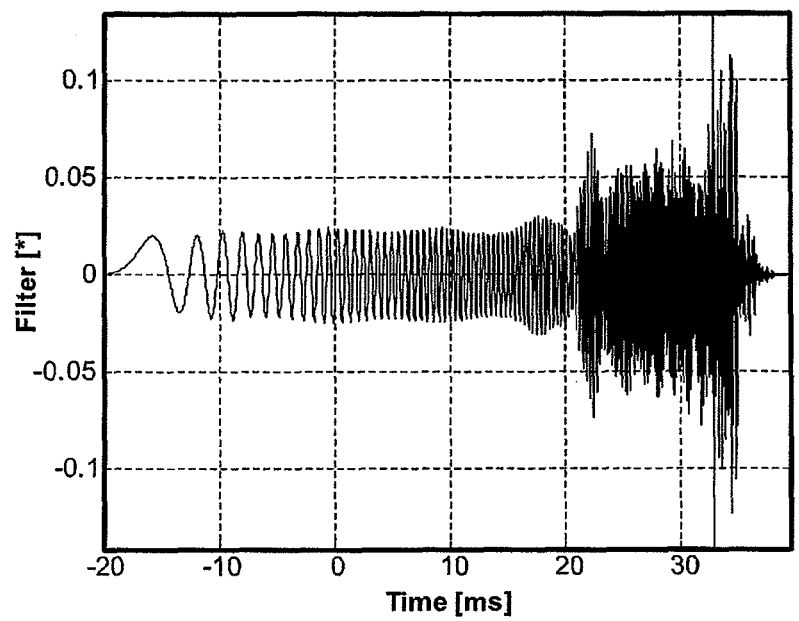
Figure 16D:
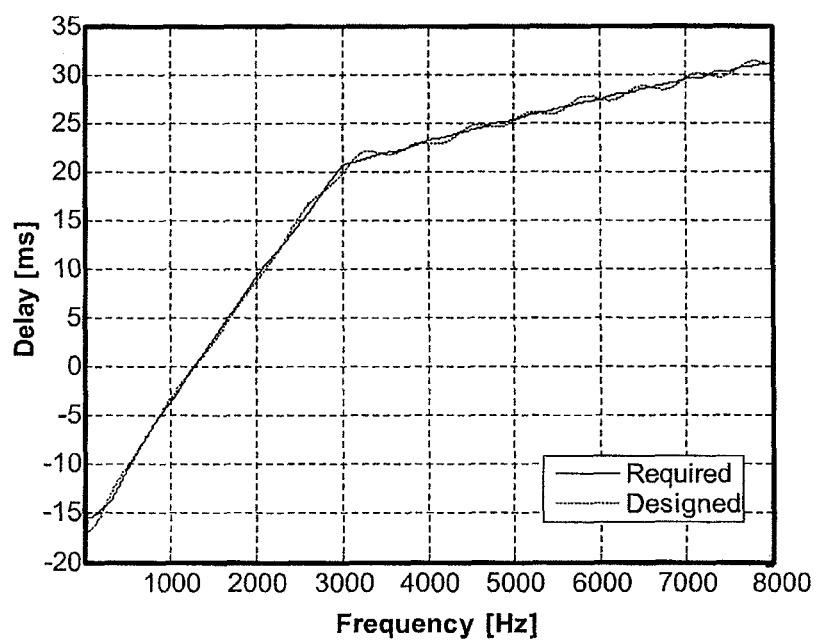
Figure 17A:
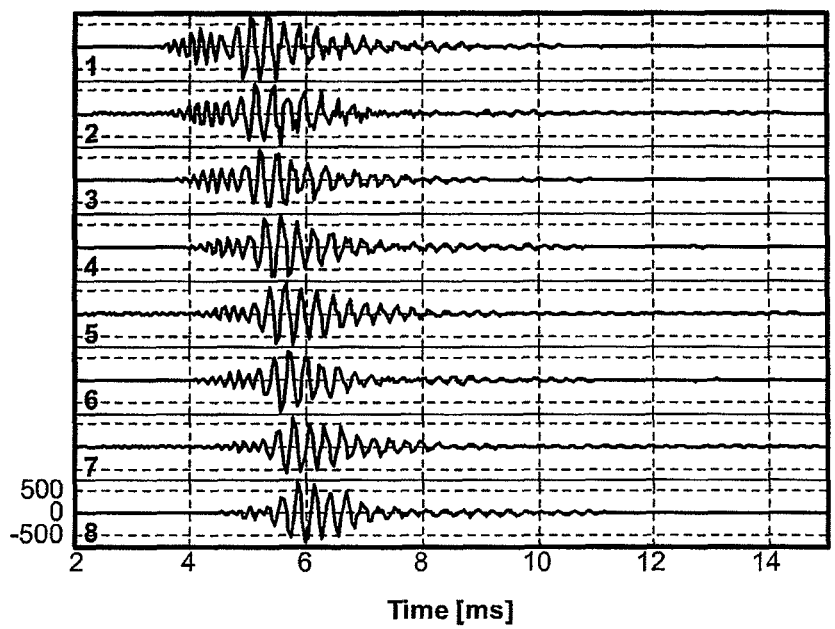
FIG. 17A, FIG. 17B, FIG. 17C and FIG. 17D show sample waveforms before and after the waveforms are filtered in accordance with an exemplary embodiment of the present invention.
Figure 17B:
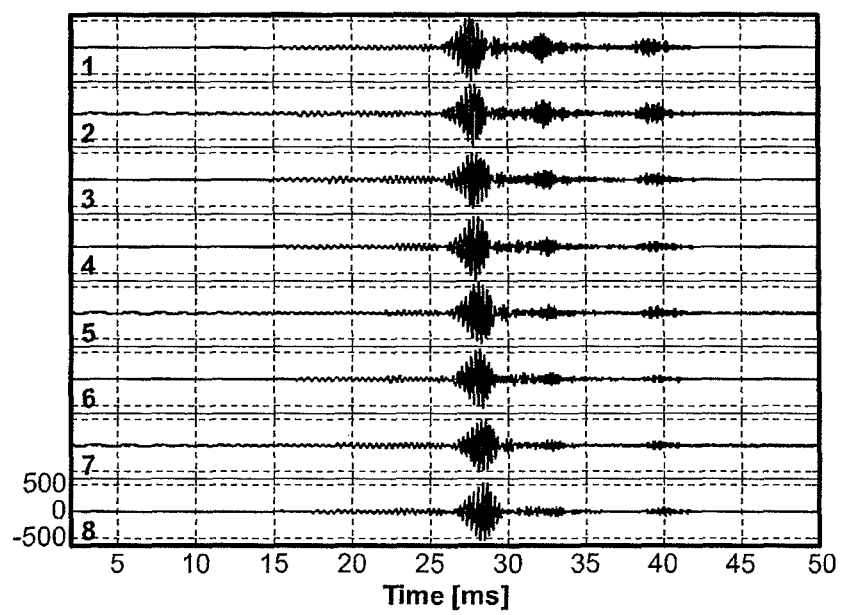
Figure 17C:
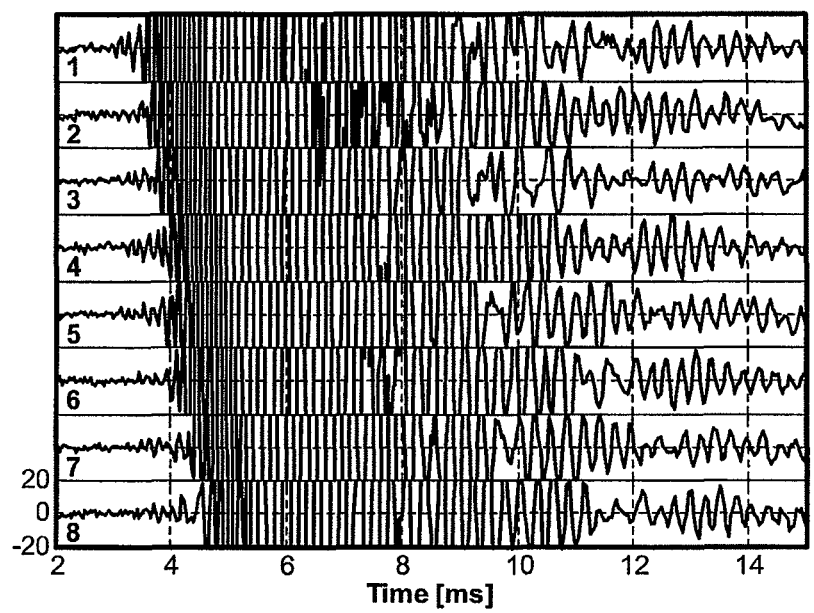
Figure 17D:
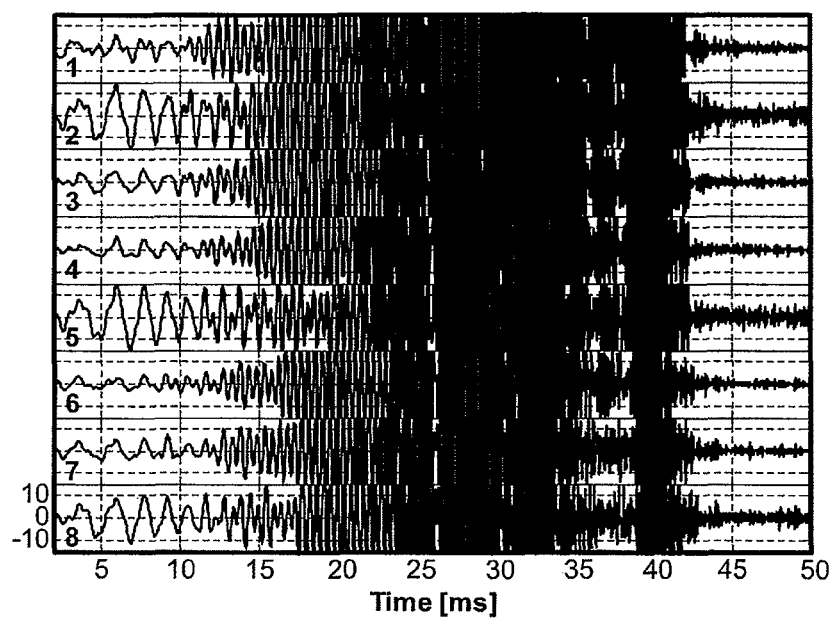

FIGS. 16A-16D show the filter design results associated with the filter used in FIGS. 15A-15C. Specifically, FIG. 16A shows the delays available in the basis set; FIG. 16B. shows the application set composition; FIG. 16C. shows the filter impulse function; and FIG. 16D. shows how closely the required delay matches with the designed delay in accordance with an exemplary embodiment of the present invention for this particular application. FIGS. 17A-17D shows example waveforms from the data of FIGS. 15A-15C, before and after filtering. As shown in FIGS. 17A-17D, in the non-filtered waveforms, high frequencies appear first, whereas in the filtered waveforms, low frequencies appear.

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. A method of improving time-semblance processing of acoustic data comprising:
    obtaining acoustic data from a tool in a formation;
    designing a delay filter, wherein the designing the delay filter comprises:
        determining a delay frequency characteristic associated with a source excitation for a formation property;
        determining a worst case frequency delay characteristic for a set of formation properties, wherein the worst case frequency delay characteristic is based on a separation frequency characteristic, wherein the separation frequency characteristic is based on the delay frequency characteristic;
        determining a target delay frequency characteristic;
        determining a required delay frequency using the delay frequency characteristic associated with a source excitation, the worst case frequency delay characteristic for the set of formation properties and the target delay frequency characteristic; and
        designing a filter that can produce the required delay frequency;
    applying the delay filter to the obtained acoustic data to obtain delayed acoustic data, wherein the delay filter produces a delay difference between a high frequency component of the obtained acoustic data and a low frequency component of the obtained acoustic data;
    applying time semblance to the delayed acoustic data to obtain a frequency-semblance-like time-semblance image; and
    producing the frequency-semblance-like time-semblance image.

2. The method of claim 1, wherein the delay filter is selected from a group consisting of an analog filter and a digital filter.

3. The method of claim 1, further comprising visualizing an image of the delayed acoustic data and inspecting the image for at least one of quality control, diagnostics and dispersive behavior.

4. The method of claim 1, further comprising eliminating noise effects from the delayed acoustic data to obtain a clean signal, wherein eliminating noise effects from the delayed acoustic data comprises applying at least one of time-slowness-windowing, band-pass filtering and filtering in depth dimension.

5. The method of claim 1, further comprising processing the delayed acoustic data, wherein processing the delayed acoustic data comprises at least one of measuring slowness, measuring slowness dispersion, determining a semblance value for slowness, and determining a Variable Density Log.

6. The method of claim 5, further comprising processing the delayed acoustic data using a time-semblance algorithm to produce a two dimensional time-slowness image.

7. The method of claim 1, wherein obtaining acoustic data from a tool in the formation comprises exciting a first source in the tool to generate a first signal and obtaining acoustic data at a receiver.

8. The method of claim 7, wherein the delay filter equalizes data delay to that of a second source excitation, further comprising processing the delayed acoustic data using a processing algorithm, wherein the processing algorithm is directed to the second source excitation.

9. A method of analyzing a formation comprising:
    placing a tool in a borehole in the formation;
        wherein the tool comprises a transmitter and at least one receiver;
    generating a signal from the transmitter;
    receiving a signal at the at least one receiver;
    designing a delay filter, wherein the designing the delay filter comprises:
        determining a delay frequency characteristic associated with a source excitation for a formation property;
        determining a worst case frequency delay characteristic for a set of formation properties, wherein the worst case frequency delay characteristic is based on a separation frequency characteristic, wherein the separation frequency characteristic is based on the delay frequency characteristic;

determining a target delay frequency characteristic;

determining a required delay frequency using the delay frequency characteristic associated with a source excitation, the worst case frequency delay characteristic for the set of formation properties and the target delay frequency characteristic; and designing a filter that can produce the required delay frequency;

applying the delay filter to the received signal to obtain a delayed signal, wherein the delay filter produces a delay difference between a high frequency component of the received signal and a low frequency component of the received signal; and applying time semblance to the delayed signal to obtain a frequency-semblance-like time-semblance image; and producing the frequency-semblance-like time-semblance image.

10. The method of claim 9, further comprising digitizing the received signal before applying the delay filter.

11. The method of claim 9, wherein the received signal is indicative of at least one of mud compressional slowness within the borehole, mud density within the borehole, borehole radius, formation compressional slowness, formation shear slowness and formation density.

12. The method of claim 9, wherein the delay filter is designed to provide at least one of a phase delay and a group delay.

13. The method of claim 9, wherein designing the filter that can produce the required delay frequency comprises using at least one of an analytical expression, a deconvolution of a first signal from a second signal of different delay, and an all-pass filter.

14. The method of claim 9, wherein designing the filter that can produce the required delay comprises:

determining a set of filter coefficients;

creating a filter set comprising a set of base filters created using the set of filter coefficients and a reversed version of the set of base filters;

determining a delay function associated with each base filter in the set of base filters;

populating an application set with one or more base filters from the filter set that minimize a difference between total delay in the application set and the required delay frequency; and determining an impulse response associated with the one or more base filters in the application set.

15. The method of claim 9, further comprising:

determining a total delay frequency characteristic associated with a formation property;

determining a total delay slowness characteristic associated with the formation property; and using the total delay frequency characteristic associated with the formation and the total delay slowness characteristic associated with the formation to determine at least one of a window in time-slowness for the formation property, a map from time slowness to time dispersion corrected slowness, a map from time slowness to quasi-frequency slowness, and a map from time-slowness to quasi-frequency-dispersion corrected slowness.

16. A method for analyzing a formation comprising:

generating, by a transmitter of an acoustic tool, a signal into a borehole;

receiving the signal at a receiver of the acoustic tool;

designing a delay filter, wherein the designing the delay filter comprises:

determining a delay frequency characteristic associated with a source excitation for a formation property;

determining a worst case frequency delay characteristic for a set of formation properties, wherein the worst case frequency delay characteristic is based on a separation frequency characteristic, wherein the separation frequency characteristic is based on the delay frequency characteristic;

determining a target delay frequency characteristic;

determining a required delay frequency using the delay frequency characteristic associated with a source excitation, the worst case frequency delay characteristic for the set of formation properties and the target delay frequency characteristic; and designing a filter that can produce the required delay frequency;

applying the delay filter to the received signal to produce a target delay in the received signal, wherein the delay filter produces a delay difference between a high frequency component of the received signal and a low frequency component of the received signal;

applying a time-semblance to the delayed filtered received signal; and producing a two-dimensional time-slowness image based on the time-semblance applied to the delayed filtered received signal.

17. The method of claim 16, wherein designing the filter that produces the required delay frequency comprises:

determining a set of filter coefficients;

creating a filter set comprising a set of base filters created using the set of filter coefficients and a reversed version of the set of base filters;

determining a delay function associated with each base filter in the set of base filters;

populating an application set with one or more base filters from the filter set that minimize a difference between total delay in the application set and the required delay frequency; and determining an impulse response associated with the one or more base filters in the application set.

* * * * *